Sept. 10, 1929. R. A. KLOCK 1,727,887
STORAGE BATTERY
Filed May 24, 1924 2 Sheets-Sheet 1
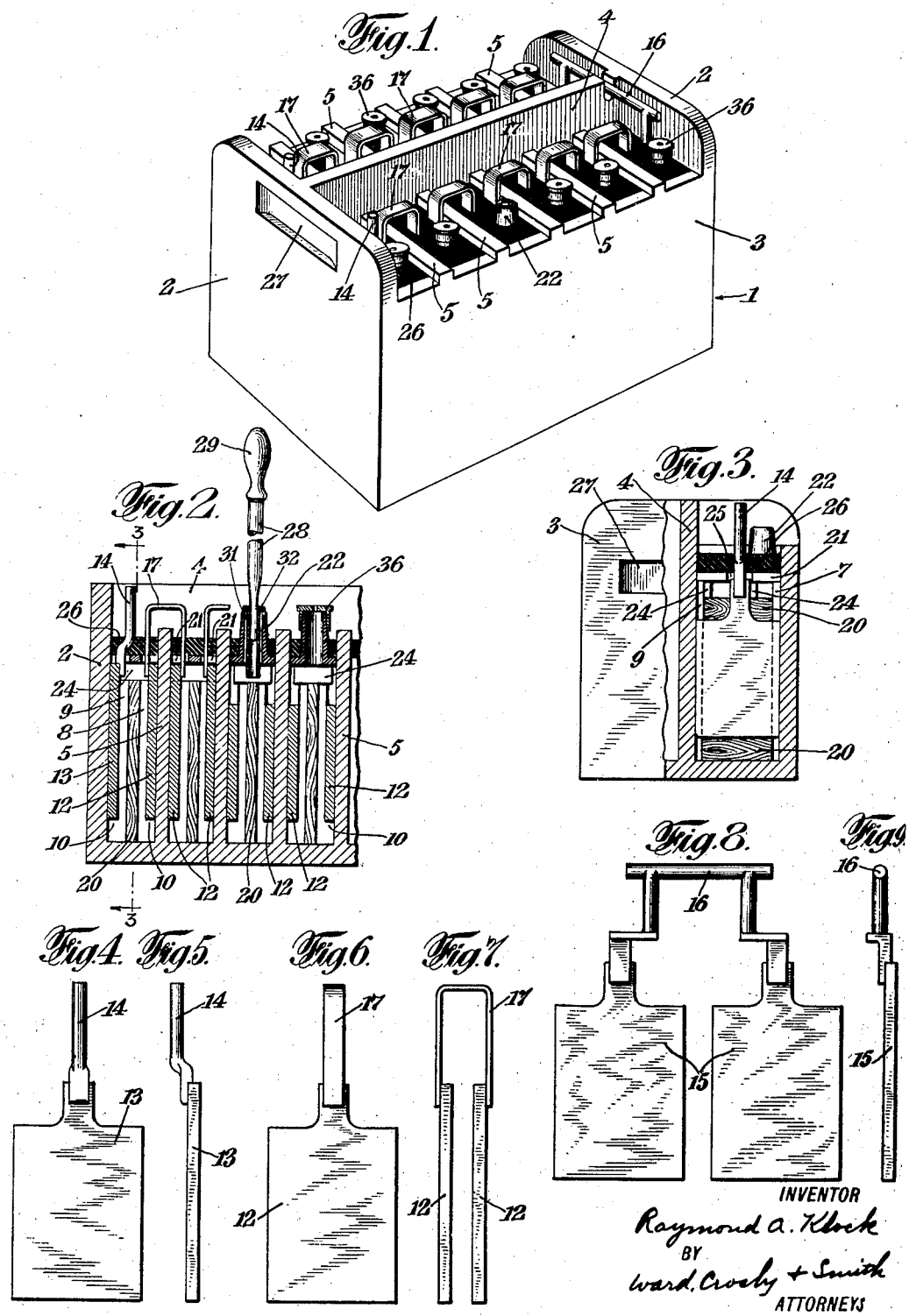
INVENTOR
Raymond A. Klock
BY
Ward, Crosby + Smith
ATTORNEYS

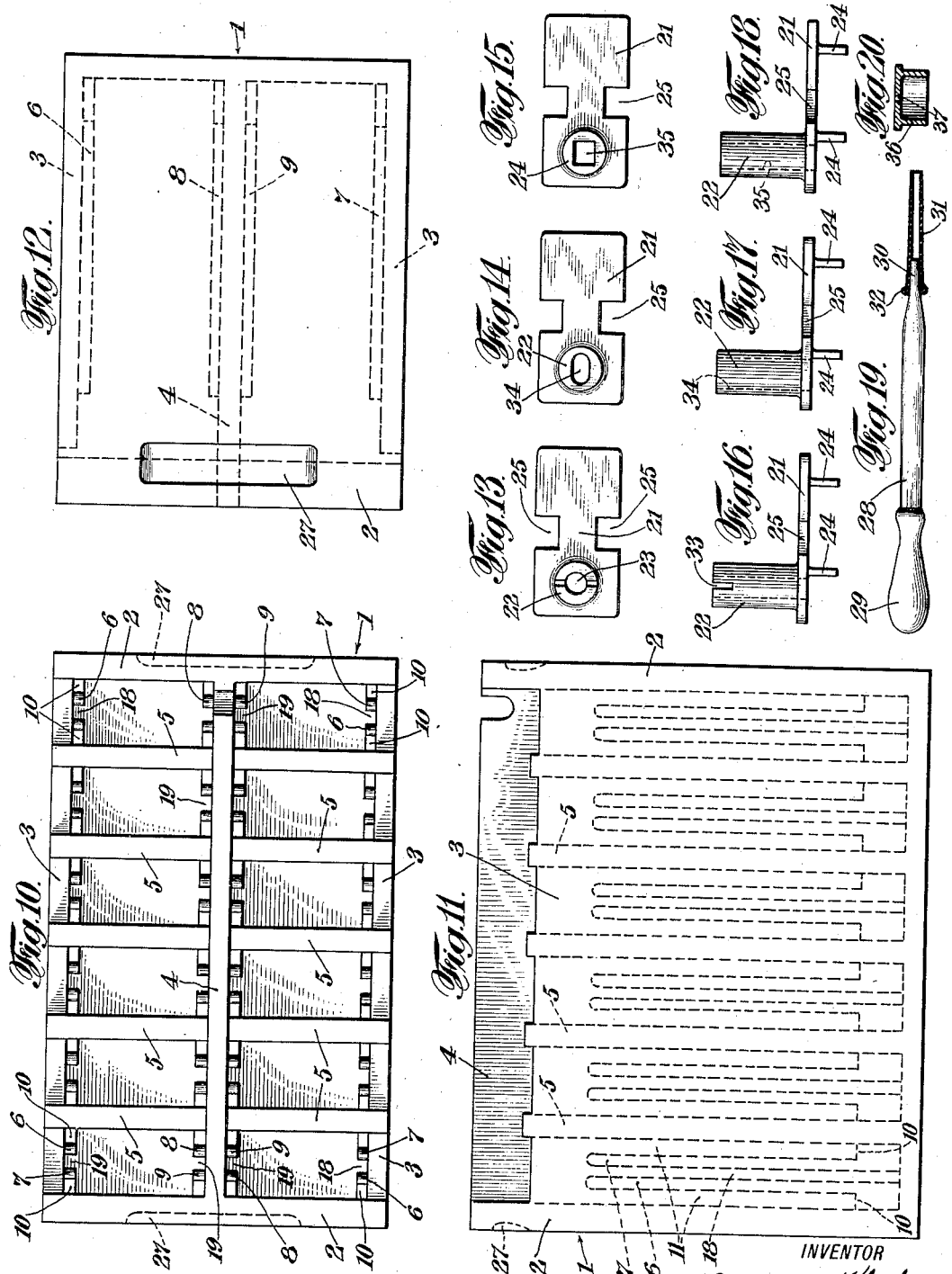

Patented Sept. 10, 1929.

1,727,887

UNITED STATES PATENT OFFICE.

RAYMOND A. KLOCK, OF CLOSTER, NEW JERSEY, ASSIGNOR, BY MESNE ASSIGNMENTS, TO GOULD STORAGE BATTERY COMPANY, INC., A CORPORATION OF NEW YORK.

STORAGE BATTERY.

Application filed May 24, 1924. Serial No. 715,525.

My invention relates to improvements in storage batteries and although applicable to many kinds of storage batteries, they are particularly useful in storage batteries of relatively high voltage and low current output; such for example as the well-known B batteries used in connection with radio receiving sets. One object of the invention is to provide improvements to enable greater ease and certainty in refilling, also to provide an arrangement which is easily assembled and more economical in construction. Further and more specific objects, features and advantages will more clearly appear from the detail description given below taken in connection with the accompanying drawings which form a part of this specification.

In the drawings Fig. 1 is a perspective view of the battery of storage cells embodying my improvements in a preferred form thereof, the filling tube being omitted. Fig. 2 is a partial section through the cells of the battery shown in Fig. 1. Fig. 3 is an end view partially in section, of the same. Fig. 4 is a face view of one of the terminal plates in the terminal cell. Fig. 5 is an edge view of the same. Fig. 6 is a face view of one of the other plates. Fig. 7 is an edge view of two of such plates showing the electrical connection therebetween. Fig. 8 is a face view of the two plates at the end opposite the battery terminals showing the electrical connection therebetween. Fig. 9 is an edge view of the same. Fig. 10 is a plan view of the battery container. Fig. 11 is a side elevation of the same. Fig. 12 is an end view of the container. Fig. 13 is a plan view of a cover member adapted for use in each of the cells. Fig. 14 is a similar view of a modified form of the cover member. Fig. 15 is a similar view of another modified form in the cover member. Fig. 16 is an elevation of the cover shown in Fig. 13. Fig. 17 is an elevation of the cover shown in Fig. 14. Fig. 18 is an elevation of the cover shown in Fig. 15. Fig. 19 is a detail showing the filling tube with rubber tip thereon, and Fig. 20 is a section of one of the soft rubber caps for covering the vent and filling openings on the cover members.

Referring to the drawings, 1 represents a suitable box like container preferably molded in one piece out of hard rubber or other suitable insulating compound capable of forming a rigid container structure. The end members 2 thereof extend considerably higher and above the side members 3. The container is provided with a longitudinal partition 4 of the same height as the end members 2. The partition 4 extends to the bottom of the container and is molded integral with the bottom and ends of the container and divides the container in two. On each side of the partition 4 the container is provided with a plurality of partitions 5. These partitions 5 are likewise molded integral with the sides and bottom of the container and with the longitudinal partition 4 thereby dividing the space on each side of the partition 4 into a plurality of cell compartments. The partitions 5 extend somewhat above the side partitions 3, but the end walls 2 and longitudinal partition 4 extend considerably above the transverse partitions 5. On the end wall thereof each cell compartment is provided with vertical ribs 6 and 7 molded integral with the sides 3 and with ribs 8 and 9 molded integral with the longitudinal partition 4. These ribs 6, 7, 8 and 9 extend from the bottom of the container to a height somewhat below the top of the sides 3 and are enlarged at the bottom to provide feet or supporting projections 10. These ribs and feet which are integral with the container provide grooves 11 in the end walls of each cell compartment. The positive and negative plates 12, a pair of which is shown in Fig. 7, are placed in the various cell compartments, the plates 12 having their edges fitting within the grooves 11 and their bottoms resting upon the feet or supports 10. The upper ends of plates 12 as shown in Fig. 7 are connected by a lead conductor strip 17 which is spaced from and arched over the partitions 5.

The battery terminal end plates are indicated at 13 in Figs. 4 and 5. These are provided with a terminal lead 14. At the opposite end of the battery the plates indicated at 15 in Figs. 8 and 9, are connected by somewhat different form of lead conducting connector as shown in Figs. 8 and 9 and indicated by the reference member 16. The ribs 6 and 7, form grooves 18 therebetween on the inside of the sides of the container and the ribs 8 and 9 form grooves 19 on the sides of the longitudinal wall 4 of the container, and fitting within these grooves in their respective cell compartments are wood separators 20. The wood separators 20 extend to the bottom of their respective cell compartments. Placed in the top of each cell compartment is a cover member such as shown at 21 in Figs. 13 and 16. This cover member is provided with an upwardly extending projection 22 having a vent and filling opening 23 extending vertically therethrough, and it is also provided with downwardly extending projections 24. These cover members are placed in the respective cell compartments as shown in Figs. 2 and 3, the same being adapted substantially to rest upon the top of the ribs 6, 7 and 8 and 9, and depending ribs or projections 24 being adapted to extend substantially to the top of the wood separators so that they are adapted to hold the separators down in place substantially to the bottom of the cells. The cover members are cut away on each side as at 25 in order to provide openings or passageways therethrough for the connectors or plate terminal leads 14, 16 and 17 respectively. In order to seal the top of the battery and hold the cover members firmly down in place, there is pressed on top of the same a sealing compound 26. This sealing compound extends over the top of the cover members and around the vent and filling opening projections 22 and to the sides and ends of the container so as to effectively seal the top of the battery, the battery terminal leads and conductors 14, 16 and 17 extending therethrough. The top of the sealing compound is preferably made to be at the same height and be level with the side walls 3 of the container. The partitions 5, however, extend some little distance above the top of the sealing compound so as to provide ridges of insulating material between the various cells and thereby tend to prevent or decrease leakage of current across the top of the cells. The longitudinal partition 4 extends considerably above so as to perform an effective insulating medium between the two series of cells on each side thereof. The end walls on the outside are provided with depressions or cutaway portions 27 forming hand-holds.

28 represents a filling tube preferably of glass provided at one end with a soft rubber bulb 29. Tube 28 has at its opposite end a narrow tubular tip 30 over which may be placed a soft rubber tubular tip 31. The rubber tip 31 is provided with a circular rim or projection 32 at its upper end. When it is desired to replenish the battery with water due to evaporation of electrolyte, the filling tube 28 is filled with distilled water by inserting the tube therein and pressing the bulb 29 and releasing the bulb whereby the water is drawn up into the tube 28. The tube is then inserted in the filling opening of the cell or cells which need to be replenished as shown in Fig. 2 and the bulb 29 compressed whereupon the distilled water is expelled therefrom and into the cell. In order that one may readily ascertain when the height of electrolyte in the cell has come up to the desired point, the length of the rubber tube 31 is made such that when the projection 32 rests upon the top of the filling opening projection 22, the lower end of the tip 31 will be at the desired height of electrolyte in the cell which is preferably slightly above the top of the wood separators. Therefore, if the filling tube is inserted until the projection 32 on the tip 31 rests upon the top of the filling opening projection 22 and no electrolyte can be withdrawn into the tube upon operation of the bulb 29, the operator knows that the cell needs replenishing and it is thereupon filled with distilled water or electrolyte until the operator can just withdraw a slight amount of electrolyte into the filling tube. That is, the operator knows that the cell has been sufficiently replenished when he can draw some electrolyte up into the tube upon compressing and releasing the bulb 29 with the head or projection 32 resting upon the top of the filling opening projection 22. In order to provide an air space around the rubber tip 31 for the escape of air from the top of the cell when additional liquid is being put therein and for the entrance of air into the cell when liquid is withdrawn therefrom, the rubber tip 31 is made slightly smaller than the opening 23 and in order that the projecting rim 32 may not close the opening around the filling tube at the top, the projection 22 is provided with slots 33 in the top thereof so that when the filling tube is in place as shown in Fig. 2, there will be passageway for air about the same from the inside of the cell to the outside atmosphere.

Referring to Figs. 14 and 17, I there show a modified form of the filling opening. The filling opening is made oval in cross-section as indicated at 34 so that spaces on opposite sides of the rubber tip 31 are left for the passage of air into and out of the cell compartment. In this case the head or rim 32 is a greater diameter than the short diameter of the oval opening 34 so that the head will rest upon the top of the filling opening projection 22, but the rim 32 is of less diameter than the greater diameter of the oval opening 34 so that air may pass readily by the head 32 when the tip 31 is in place in the filling opening. In Figs. 15 and 16 still another modification is shown in which the filling opening 35 is square in cross-section, the diameter of the head or rim 32 being greater than the length of one of the sides of the square so that the same will rest upon the top of the filling opening while the diameter of the projecting rim 32 is less than the diagonal of the square so as to leave spaces at the corners for the passage of air into and out of the cell. After the cells are properly replenished, each of the vent and filling opening projections is covered with a soft rubber cap 36 having a small vent opening 37 therethrough to permit the escape of gases during normal operation of the battery.

While I have described my improvements in great detail and with respect to certain preferred embodiments thereof, nevertheless I do not desire to be limited to such details or forms since many changes and modifications may be made and the invention embodied in widely different forms without departing from the spirit and scope thereof in its broader aspects. Hence I desire to cover all forms and features coming within the language or scope of any one or more of the appended claims.

What I claim as new and desire to secure by Letters Patent is:

1. A storage battery cell having positive and negative plates and electrolyte therein, means covering the top of the cell and having a filling opening therethrough, a filling tube adapted to be inserted in the filling opening, said tube having means limiting its insertion into the filling opening to a distance where the end of the tube will be substantially at the desired level of electrolyte in the cell, said tube and opening being of different cross sectional shape whereby when the tube is so inserted to its limit there will be a passage-way between the tube and opening from the inside of the cell to the outside atmosphere and vice versa for the passage of air.

2. A storage battery cell having positive and negative plates and electrolyte therein, means covering the top of the cell and having a filling opening therethrough, a filling tube adapted to be inserted in the filling opening, said tube having means limiting its insertion into the filling opening to a distance where the end of the tube will be substantially at the desired level of electrolyte in the cell, said tube being round in cross-section and said opening oval in cross-section when the tube is so inserted to its limit there will be a passage-way between the tube and opening from the inside of the cell to the outside atmosphere and vice versa for the passage of air.

3. A storage battery cell having positive and negative plates and electrolyte therein, means covering the top of the cell and having a filling opening therethrough, a filling tube adapted to be inserted in the filling opening, said tube having means limiting its insertion into the filling opening to a distance where the end of the tube will be substantially at the desired level of electrolyte in the cell, said means comprising a projecting circular flange on the tube and said opening being so shaped that when the tube is so inserted there will be a passageway between the tube and opening for the passage of air from the inside of the cell to the outside atmosphere and vice versa, past said circular flange.

4. A storage battery cell having positive and negative plates and electrolyte therein, means covering the top of the cell and having a filling opening therethrough, a filling tube adapted to be inserted in the filling opening, said tube having means limiting its insertion into the filling opening to a distance where the end of the tube will be substantially at the desired level of electrolyte in the cell, said means comprising a projection on said tube adapted to rest on top of said opening but incompletely covering the same so that when the tube is so inserted to its limit there will be a passageway between the tube and opening from the inside of the cell to the outside atmosphere and vice versa for the passage of air.

5. A storage battery cell having positive and negative plates and electrolyte therein, means covering the top of the cell and having a filling opening therethrough, a filling tube adapted to be inserted in the filling opening, said tube having means limiting its insertion into the filling opening to a distance where the end of the tube will be substantially at the desired level of electrolyte in the cell, said means comprising a projection on said tube adapted to rest on top of said opening but incompletely covering the same so that when the tube is so inserted to its limit there will be a passageway between the tube and opening from the inside of the cell to the outside atmosphere and vice versa for the passage of air, said tube and projection being formed of soft rubber, and a glass tube inserted in the end thereof on which said projection is located, and a soft rubber bulb on the other end of said glass tube.

6. A storage battery cell having positive and negative plates and electrolyte therein and means covering the top of the cell and having a filling opening therein into which is adapted to be inserted a filling tube having means limiting the insertion of the tube into the opening to a distance where the end of the tube will be substantially at the desired level of electrolyte in the cell, said opening being so shaped that when the tube is so inserted to its limit there will be a passageway between the tube and opening from the inside of the cell to the outside atmosphere and vice versa for the passage of air.

7. A storage battery cell having positive and negative plates and electrolyte therein and means covering the top of the cell and having a filling opening therein into which is adapted to be inserted a filling tube having a means limiting the insertion of the tube into the opening to a distance where the end of the tube will be substantially at the desired level of electrolyte in the cell, said opening being oval in horizontal cross-section and so shaped with respect to the tube that when the tube is so inserted to its limit there will be a passageway between the tube and opening from the inside of the cell to the outside atmosphere and vice versa for the passage of air.

8. In a storage battery, the combination of a container having partitions forming a plurality of rows of liquid-tight cell compartments, each cell comprising a positive and negative plate and electrolyte, one of the partitions extending between the end walls of the container, separator plates between the battery plates of each cell, vertical grooves formed at said last partition and at the walls of the container parallel therewith, for receiving and holding the separator plates in position, covers for said individual cells, said covers having means for engaging the separator plates to hold the latter down on their seats, and a sealing compound for holding the covers in position on the separator plates.

9. A storage battery comprising in its structure a container having a longitudinal partition and a plurality of transverse partitions forming therein a plurality of rows of liquid-tight compartments, storage battery plates in said compartments, ridges forming grooves at the walls of said compartments for receiving and holding the plates in place, said grooves terminating above the bottom of the compartments so as to prevent the plates from touching the bottom thereof, separators between said plates, said ridges forming means for holding the separators between said plates, and means for holding the separators down against the bottom of the compartments whereby to divide the compartments into sub-compartments and prevent solid matter from passing from one sub-compartment to the other.

In testimony whereof I have signed my name to this specification.

RAYMOND A. KLOCK.